US012240717B2

(12) United States Patent
Samoto et al.

(10) Patent No.: US 12,240,717 B2
(45) Date of Patent: *Mar. 4, 2025

(54) IMAGE RECORDING DEVICE

(71) Applicant: BROTHER KOGYO KABUSHIKI KAISHA, Nagoya (JP)

(72) Inventors: Kenji Samoto, Nagoya (JP); Yuji Koga, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,928

(22) Filed: Feb. 9, 2022

(65) Prior Publication Data

US 2022/0306411 A1 Sep. 29, 2022

Related U.S. Application Data

(63) Continuation of application No. 16/363,266, filed on Mar. 25, 2019, now Pat. No. 11,279,577, which is a (Continued)

(30) Foreign Application Priority Data

Dec. 29, 2009 (JP) ................................ 2009-299236

(51) Int. Cl.
*B65H 1/26* (2006.01)
*B41J 3/60* (2006.01)
(Continued)

(52) U.S. Cl.
CPC ................ *B65H 1/266* (2013.01); *B41J 3/60* (2013.01); *B41J 13/0045* (2013.01); (Continued)

(58) Field of Classification Search
CPC .................................................... B65H 3/0684
See application file for complete search history.

(56) References Cited

U.S. PATENT DOCUMENTS 4,786,039 A 11/1988 Ito
5,132,741 A 7/1992 Kitajima et al.
(Continued)

FOREIGN PATENT DOCUMENTS

CN 1119991 A 4/1996
CN 1501185 A 6/2004
(Continued)

OTHER PUBLICATIONS

U.S. Notice of Allowance dated Apr. 13, 2017 received in U.S. Appl. No. 15/405,910.
(Continued)

*Primary Examiner* — Howard J Sanders
(74) *Attorney, Agent, or Firm* — Scully, Scott, Murphy & Presser, P.C.

(57) ABSTRACT

An image recording device having a recording unit to record an image on a sheet is provided. The image recording unit includes a feed guide defining a first conveying path; an arm disposed between the recording unit and the tray, the arm having a feed roller rotatably disposed at a free end and configured to feed the sheet in the tray to the first conveying path. The arm pivots between a first arm position, and a second arm position. The return guide pivots between a first return guide position, and a second return guide position. A space occupied by the return guide in the first return guide position overlaps a space occupied by the arm in the second arm position. The return guide is in the second return guide position when the arm is in the second arm position which is retracted from an insertion space occupied by the tray.

13 Claims, 7 Drawing Sheets

Related U.S. Application Data continuation of application No. 15/816,395, filed on Nov. 17, 2017, now Pat. No. 10,273,099, which is a continuation of application No. 14/792,002, filed on Jul. 6, 2015, now Pat. No. 9,821,967, which is a continuation of application No. 14/319,913, filed on Jun. 30, 2014, now Pat. No. 9,085,430, which is a continuation of application No. 13/944,655, filed on Jul. 17, 2013, now Pat. No. 8,764,006, which is a continuation of application No. 12/892,357, filed on Sep. 28, 2010, now Pat. No. 8,493,639.

(51) Int. Cl.
*B41J 13/00* (2006.01)
*B65H 3/06* (2006.01)
*B65H 5/06* (2006.01)
*B65H 85/00* (2006.01)

(52) U.S. Cl.
CPC .......... *B65H 3/0684* (2013.01); *B65H 5/068* (2013.01); *B65H 85/00* (2013.01); *B65H 2405/325* (2013.01)

(56) References Cited

U.S. PATENT DOCUMENTS

| | | | |
|---|---|---|---|
| 5,284,333 | A | 2/1994 | Ishikawa |
| 5,351,112 | A | 9/1994 | Naito et al. |
| 5,364,195 | A | 11/1994 | Kanemitsu et al. |
| 5,408,301 | A | 4/1995 | Tokishige et al. |
| 5,727,890 | A | 3/1998 | Stodder |
| 5,791,645 | A | 8/1998 | Takada |
| 5,799,237 | A | 8/1998 | Ueda et al. |
| 5,953,575 | A | 9/1999 | Park et al. |
| 6,078,345 | A | 6/2000 | Yamakawa et al. |
| 6,088,135 | A | 7/2000 | Kusumoto |
| 6,126,347 | A | 10/2000 | Sakaino et al. |
| 6,152,561 | A | 11/2000 | Watanabe |
| 6,185,381 | B1 | 2/2001 | Nakahara et al. |
| 6,293,716 | B1 | 9/2001 | Driggers et al. |
| 6,892,048 | B2 | 5/2005 | Eskey |
| 6,909,872 | B2 | 6/2005 | Eskey |
| 7,258,335 | B2 | 8/2007 | Johnson et al. |
| 7,258,355 | B2 | 8/2007 | Amano |
| 7,308,853 | B2 | 12/2007 | Satoh et al. |
| 7,374,281 | B2 | 5/2008 | Saito et al. |
| 7,413,183 | B2 | 8/2008 | Asada et al. |
| 7,437,119 | B2 | 10/2008 | Takemoto et al. |
| 7,469,981 | B2 | 12/2008 | Katsuyama et al. |
| 7,527,264 | B2 | 5/2009 | Terada |
| 7,614,738 | B2 | 11/2009 | Takeuchi |
| 7,717,423 | B2 | 5/2010 | Litman et al. |
| 7,778,572 | B2 | 8/2010 | Iijima |
| 7,850,299 | B2 | 12/2010 | Hiroki et al. |
| 7,887,044 | B2 | 2/2011 | Uchino et al. |
| 7,959,147 | B2 | 6/2011 | Izuchi et al. |
| 8,087,769 | B2 | 1/2012 | Hiroki et al. |
| 8,144,374 | B2 | 3/2012 | Taniguchi |
| 8,152,161 | B2 | 4/2012 | Samoto et al. |
| 8,152,169 | B2 | 4/2012 | Samoto et al. |
| 8,152,391 | B2 | 4/2012 | Asada |
| 8,172,225 | B2 | 5/2012 | Tanahashi |
| 8,208,180 | B2 | 6/2012 | Osakabe et al. |
| 8,240,655 | B2 | 8/2012 | Samoto et al. |
| 8,289,589 | B2 | 10/2012 | Matsushima |
| 8,493,639 | B2 | 7/2013 | Samoto et al. |
| 8,508,819 | B2 | 8/2013 | Asada et al. |
| 8,764,006 | B2 | 7/2014 | Samoto et al. |
| 8,768,235 | B2 | 7/2014 | Asada et al. |
| 9,045,302 | B2 | 6/2015 | Asada et al. |
| 9,049,326 | B2 | 6/2015 | Miura et al. |
| 9,051,144 | B2 | 6/2015 | Asada et al. |
| 9,085,430 | B2 | 7/2015 | Samoto et al. |
| 9,283,778 | B2 | 3/2016 | Asada et al. |
| 9,440,460 | B2 | 9/2016 | Asada et al. |
| 9,452,619 | B2 | 9/2016 | Asada et al. |
| 9,821,967 | B2 | 11/2017 | Samoto et al. |
| 10,086,629 | B2 | 10/2018 | Asada et al. |
| 10,273,099 | B2 | 4/2019 | Samoto et al. |
| 10,414,174 | B2 | 9/2019 | Asada et al. |
| 10,668,746 | B2 | 6/2020 | Asada et al. |
| 2001/0017439 | A1 | 8/2001 | Hiramatsu |
| 2002/0084574 | A1* | 7/2002 | Kim ...................... B65H 1/266 271/118 |
| 2002/0117800 | A1 | 8/2002 | Kawarama et al. |
| 2004/0086310 | A1 | 5/2004 | Eskey |
| 2004/0091300 | A1 | 5/2004 | Jang |
| 2005/0194731 | A1 | 9/2005 | Ohama et al. |
| 2006/0071399 | A1 | 4/2006 | Asada et al. |
| 2006/0163799 | A1 | 7/2006 | Goh et al. |
| 2006/0261535 | A1 | 11/2006 | Shiohara et al. |
| 2006/0268089 | A1 | 11/2006 | Takeuchi |
| 2007/0097458 | A1 | 5/2007 | Harada et al. |
| 2007/0122225 | A1 | 5/2007 | Zuchi et al. |
| 2007/0126837 | A1 | 6/2007 | Takahashi et al. |
| 2007/0145670 | A1* | 6/2007 | Asada ................. B65H 3/0676 271/117 |
| 2008/0240824 | A1 | 10/2008 | Asada |
| 2009/0026685 | A1 | 1/2009 | Uchino et al. |
| 2009/0087239 | A1 | 4/2009 | Uchino et al. |
| 2009/0102908 | A1 | 4/2009 | Imoto |
| 2009/0108516 | A1 | 4/2009 | Shigeno et al. |
| 2009/0189966 | A1 | 7/2009 | Sugimoto et al. |
| 2010/0231675 | A1 | 9/2010 | Kato |
| 2010/0278575 | A1 | 11/2010 | Mizuno et al. |
| 2011/0156338 | A1 | 6/2011 | Samoto |
| 2011/0157664 | A1 | 6/2011 | Samoto |
| 2011/0158725 | A1 | 6/2011 | Asada et al. |
| 2011/0188097 | A1 | 8/2011 | Asada |
| 2011/0291347 | A1 | 12/2011 | Sano et al. |
| 2011/0310206 | A1 | 12/2011 | Samoto et al. |
| 2011/0311294 | A1 | 12/2011 | Kawamata et al. |
| 2011/0317198 | A1 | 12/2011 | Suzuki |
| 2013/0300051 | A1 | 11/2013 | Samoto et al. |
| 2013/0321548 | A1 | 12/2013 | Asada et al. |
| 2014/0211274 | A1 | 7/2014 | Ohta |
| 2014/0312555 | A1 | 10/2014 | Samoto et al. |
| 2017/0120633 | A1 | 5/2017 | Asada et al. |

FOREIGN PATENT DOCUMENTS

| | | | |
|---|---|---|---|
| EP | 2082886 | A2 | 7/2009 |
| JP | 61-78138 | U | 5/1986 |
| JP | 102-295837 | A | 12/1990 |
| JP | H06-144633 | A | 5/1994 |
| JP | 2002-321838 | A | 11/2002 |
| JP | 2002-362766 | A | 12/2002 |
| JP | 2003-095475 | A | 4/2003 |
| JP | 2006-151639 | A | 6/2006 |
| JP | 2008-247537 | A | 10/2008 |
| JP | 2009-1412 | A | 1/2009 |
| JP | 2009-023831 | A | 2/2009 |
| JP | 2009-107803 | A | 5/2009 |
| JP | 2020-073415 | A | 5/2020 |

OTHER PUBLICATIONS

U.S. Notice of Allowance dated Jul. 31, 2017 received in U.S. Appl. No. 15/405,910.

U.S. Office Action dated Sep. 6, 2017 received in U.S. Appl. No. 15/637,502.

U.S. Notice of Allowance dated Jan. 24, 2018 received in U.S. Appl. No. 15/637,502.

U.S. Notice of Allowance dated Dec. 17, 2018 received in U.S. Appl. No. 15/816,395.

U.S. Office Action dated Oct. 31, 2018 received in U.S. Appl. No. 15/816,395.

U.S. Notice of Allowance dated May 7, 2019 received in U.S. Appl. No. 16/134,477.

U.S. Notice of Allowance dated Jan. 27, 2020 received in U.S. Appl. No. 16/214,954.

(56) References Cited

OTHER PUBLICATIONS

U.S. Office Action dated Mar. 13, 2020 received in U.S. Appl. No. 16/544,340.
U.S. Office Action dated Jul. 27, 2020 received in U.S. Appl. No. 16/544,340.
Office Action dated Oct. 9, 2020 received in related U.S. Appl. No. 16/889,126.
Office Action dated Nov. 17, 2020 received in related U.S. Appl. No. 16/363,266.
Official Action dated Feb. 9, 2021 received in Japanese Patent Application No. JP 2020-018613 together with an English language translation.
U.S. Notice of Allowance dated Mar. 31, 2021 received in U.S. Appl. No. 16/544,340.
Office Action dated Jun. 10, 2021 received in related U.S. Appl. No. 16/363,266.
U.S. Notice of Allowance dated Nov. 8, 2021 received in U.S. Appl. No. 16/363,266.
Notice of Reasons for Refusal dated Apr. 12, 2022 received from the Japanese Patent Office in related JP 2021-087632 together with an English language translation.
United States Notice of Allowance dated Apr. 18, 2013 received in related U.S. Appl. No. 12/892,377.
Japanese Official Action dated Feb. 26, 2013 from related application JP 2009-299236 together with an English language translation.
Japanese Official Action dated Feb. 26, 2013 from related application JP 2009-299273 together with an English language translation.
Japanese Official Action dated Mar. 12, 2013 from related application JP 2009-299254 together with an English language translation.
United States Official Action dated Jan. 3, 2012 from related application U.S. Appl. No. 12/892,400.
United States Official Action dated May 17, 2013 received in related U.S. Appl. No. 12/892,390.
Notice of Allowance dated Apr. 16, 2012 from related U.S. Appl. No. 12/892,400.
United States Office Action dated Nov. 28, 2012 from related U.S. Appl. No. 12/892,377.
United States Office Action dated Jan. 11, 2013 from related U.S. Appl. No. 12/892,390.
Chinese Official Action dated Dec. 31, 2012 from related application CN 201010505634.4 together with an English language translation.
Extended European Search Report dated Feb. 7, 2013 from related application EP 10011234.1-1251.
Extended European Search Report dated Feb. 1, 2013 from related application EP 10011233.3-1251.
United States Office Action dated Nov. 15, 2012 from U.S. Appl. No. 12/892,357.
United States Notice of Allowance dated Mar. 15, 2013 from U.S. Appl. No. 12/892,357.
Notice of Allowability dated Apr. 3, 2013 from U.S. Appl. No. 12/892,357.
Notice of Allowability dated Apr. 9, 2013 from U.S. Appl. No. 12/892,357.
Notice of Allowability dated May 7, 2013 from U.S. Appl. No. 12/892,357.
Notice of Allowability dated May 24, 2013 from U.S. Appl. No. 12/892,357.
Notice of Allowability dated Jun. 3, 2013 from U.S. Appl. No. 12/892,357.
U.S. Office Action dated Nov. 14, 2013 received in related U.S. Appl. No. 12/892,390.
Notice of Allowance dated Feb. 20, 2014 received in related U.S. Appl. No. 12/892,390.
U. S. Office Action dated Dec. 10, 2013 received in related U.S. Appl. No. 13/944,655.
Notice of Allowance dated Feb. 19, 2014 received in related U.S. Appl. No. 13/944,655.
Corrected Notice of Allowance dated May 20, 2014 received in related U.S. Appl. No. 13/944,655.
Notice of Allowance dated Feb. 5, 2015 received in related U.S. Appl. No. 14/319,523.
Notice of Reasons for Rejection dated Aug. 19, 2014 received in related application JP 2013-149146 together with an English language translation.
Notice of Allowance dated Mar. 18, 2015 received in related U.S. Appl. No. 14/319,913.
Japanese Office Action dated Oct. 15, 2013 received from Japanese Patent Office in counterpart Japanese Patent Application No. 2009-299254.
United States Official Action dated Dec. 31, 2015 from related U.S. Appl. No. 14/949,233.
United States Official Action dated Jan. 6, 2016 from related U.S. Appl. No. 14/949,251.
United States Notice of Allowance dated May 16, 2016 from related U.S. Appl. No. 14/949,233.
United States Notice of Allowance dated May 17, 2016 from related U.S. Appl. No. 14/949,251.
United States Official Action dated Jan. 5, 2017 received in related U.S. Appl. No. 15/276,206.
Notice of Allowance dated Mar. 6, 2017 received in related U.S. Appl. No. 15/405,910.
United States Office Action dated May 31, 2017 received in related U.S. Appl. No. 15/276,206.
United States Office Action dated Feb. 23, 2017 received in related U.S. Appl. No. 14/792,002.
United States Notice of Allowance dated Jul. 7, 2017 received in related U.S. Appl. No. 14/792,002.
Notice of Allowance dated Jul. 22, 2015 received in related U.S. Appl. No. 14/727,290.
Notice of Allowance dated Oct. 22, 2015 received in related U.S. Appl. No. 14/727,290.
Corrected Notice of Allowability dated Feb. 9, 2016 received in related U.S. Appl. No. 14/727,290.
Notice of Allowance dated May 18, 2015 received in related U.S. Appl. No. 14/319,413.
Corrected Notice of Allowance dated Jul. 31, 2017 received in related U.S. Appl. No. 14/792,002.
Notice of Allowance dated Nov. 20, 2017 received in related U.S. Appl. No. 15/276,206.
U.S. Notice of Allowance dated May 17, 2013 received in U.S. Appl. No. 12/892,357.
U.S. Notice of Allowance dated May 20, 2014 received in U.S. Appl. No. 13/944,655.
U.S. Office Action dated Jun. 23, 2015 received in U.S. Appl. No. 13/960,306.
U.S. Notice of Allowance dated Oct. 29, 2015 received in U.S. Appl. No. 13/960,306.
U.S. Notice of Allowance dated Apr. 21, 2015 received in U.S. Appl. No. 14/319,913.
U.S. Notice of Allowance dated May 22, 2015 received in U.S. Appl. No. 14/319,913.
U.S. Notice of Allowance dated Sep. 9, 2016 received in U.S. Appl. No. 15/062,647.
Notice of Reasons for Refusal dated Sep. 26, 2023 received in Japanese Patent Application No. JP 2022-163001.
Decision of Refusal dated Feb. 27, 2024 received in Japanese Patent Application No. JP 2022-163001.

* cited by examiner

IMAGE RECORDING DEVICE

CROSS REFERENCE TO RELATED APPLICATIONS

This application is a continuation application of U.S. Ser. No. 16/363,266 filed on Mar. 25, 2019, which is a continuation application of U.S. Ser. No. 15/816,395 filed on Nov. 17, 2017, now U.S. Pat. No. 10,273,099 issued on Apr. 30, 2019, which is a continuation of U.S. Ser. No. 14/792,002 filed on Jul. 6, 2015, now U.S. Pat. No. 9,821,967 issued on Nov. 21, 2017 which is a continuation of U.S. Ser. No. 14/319,913 filed on Jun. 30, 2014, now U.S. Pat. No. 9,085,430 issued on Jul. 21, 2015, which is a continuation application of U.S. Ser. No. 13/944,655 filed on Jul. 17, 2013, now U.S. Pat. No. 8,764,006 issued on Jul. 1, 2014, which is a continuation application of U.S. Ser. No. 12/892,357 filed on Sep. 28, 2010, now U.S. Pat. No. 8,493,639 issued on Jul. 23, 2013 and claims priority from Japanese Patent Application No. 2009-299236, which was filed on Dec. 29, 2009, the disclosures of each of which are incorporated herein by reference in their entirety.

BACKGROUND OF THE INVENTION

Field of the Invention

This application relates to an image recording device configured to record an image on a sheet, and particularly to an image recording device configured to record an image on both sides of a sheet.

Description of Related Art

Known image recording devices are configured to record an image on both sides of a sheet. A sheet fed out by a sheet feeder is conveyed by a conveying roller to an image forming unit where an image is recorded on one side of the sheet. The sheet having an image recorded on one side thereof is switched back by a discharging roller provided on a downstream side of the image forming unit. The sheet reaches the conveying roller again through a return path provided below the image forming unit. Then, an image is recorded on the other side of the sheet by the image forming unit. The sheet having an image on both sides of the sheet is discharged by the discharging roller.

In the known image recording devices, the sheet feeder includes a feed arm provided above a sheet tray so as to pivot about a predetermined shaft, and a feed roller provided at a free end of the feed arm. The feed roller rotates to feed out the sheets stored in the sheet tray.

When the feed arm is configured to pivot upward during insertion and removal of the tray into and from the image recording device, a space for the feed arm to retract from the tray is required between the feed arm and the return path provided above the feed arm. This increases the size of the image recording device.

SUMMARY OF THE INVENTION

Accordingly, in view of the above-described problems, it is an object of the present invention to provide an image recording device having an adequate space for a feed arm to retract from a movable sheet tray while preventing an increase in size of the device.

Technical advantages of the invention are an adequate space for the feed arm to retract from the movable sheet tray is ensured while preventing an increase in size of the device.

According to an embodiment of the invention, an image recording device includes: a recording unit configured to record an image on a sheet; a tray disposed below the recording unit, having a sheet holding surface, and configured to be inserted into and removed from the image recording device; a feed guide defining a curved first conveying path and configured to guide the sheet to the recording unit; an arm disposed between the recording unit and the tray and configured to pivot between a first arm position and a second arm position where a free end of the arm is farther from the sheet holding surface than in the first arm position and is retracted from an insertion space of the image recording device dimensioned to accept the tray; a feed roller rotatably disposed at the free end of the arm and configured to feed the sheet on the sheet holding surface of the tray to the first conveying path when the arm is in the first arm position; and a return guide disposed between the recording unit and the arm and configured to pivot between a first return guide position where the return guide at least partially defines a second conveying path and guides the sheet having an image recorded thereon back to the feed guide, and a second return guide position where a free end of the return guide is closer to the recording unit than in the first return guide position. Additionally, a space occupied by the return guide in the first return guide position overlaps a space occupied by the arm in the second arm position, and the return guide is in the second return guide position when the arm is in the second arm position.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

DETAILED DESCRIPTION OF EMBODIMENTS

Figure 1:
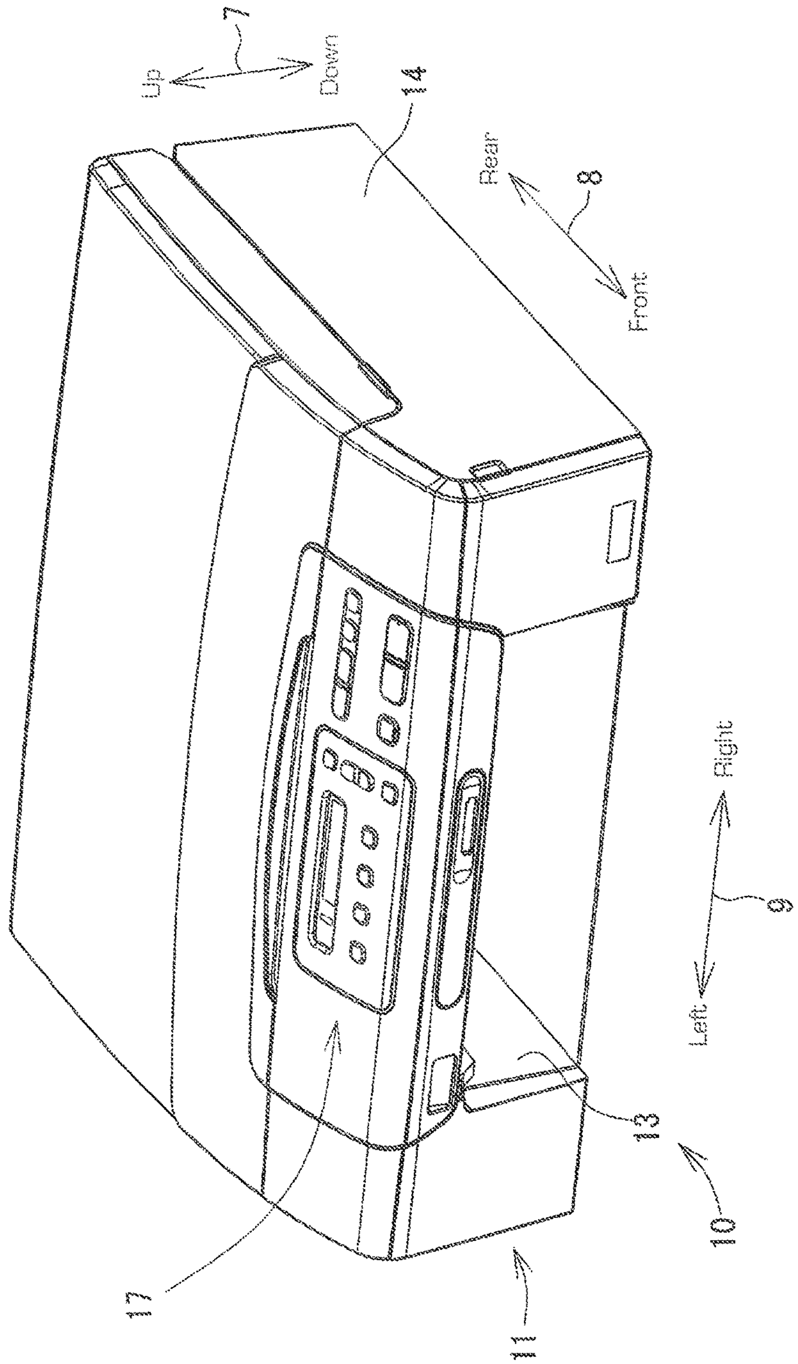
FIG. 1 is a perspective view of a multi-function device according to an embodiment of the present invention.

In the following description, an up-down direction 7 is defined with reference to a use state of a multi-function device 10 (state illustrated in FIG. 1), a front-rear direction 8 is defined so that a side where an opening 13 is provided is a front side, and a right-left direction 9 is defined with reference to a front view of the multi-function device 10.

Referring to FIG. 1, the multi-function device 10 is substantially shaped like a thin rectangular parallelepiped, and a printer 11 of an inkjet recording type is provided in a lower part thereof. The multi-function device 10 has various functions such as a facsimile function and a print function. As the print function, the multi-function device 10 has a duplex image recording function for recording images on both sides of a sheet. The functions other than the print function are optional. The printer 11 includes a casing 14 having an opening 13 on the front side. Through the opening 13, a sheet tray unit 78 (see FIG. 2), having a tray 20 on which recording media, e.g., sheets, of various sizes are stacked, can be inserted and removed in the front-rear direction 8. At the upper front of the multi-function device 10, an operation panel 17 is provided so that the printer 11 can be operated therewith. The multi-function device 10 operates according to an input from the operation panel 17.

Figure 2:
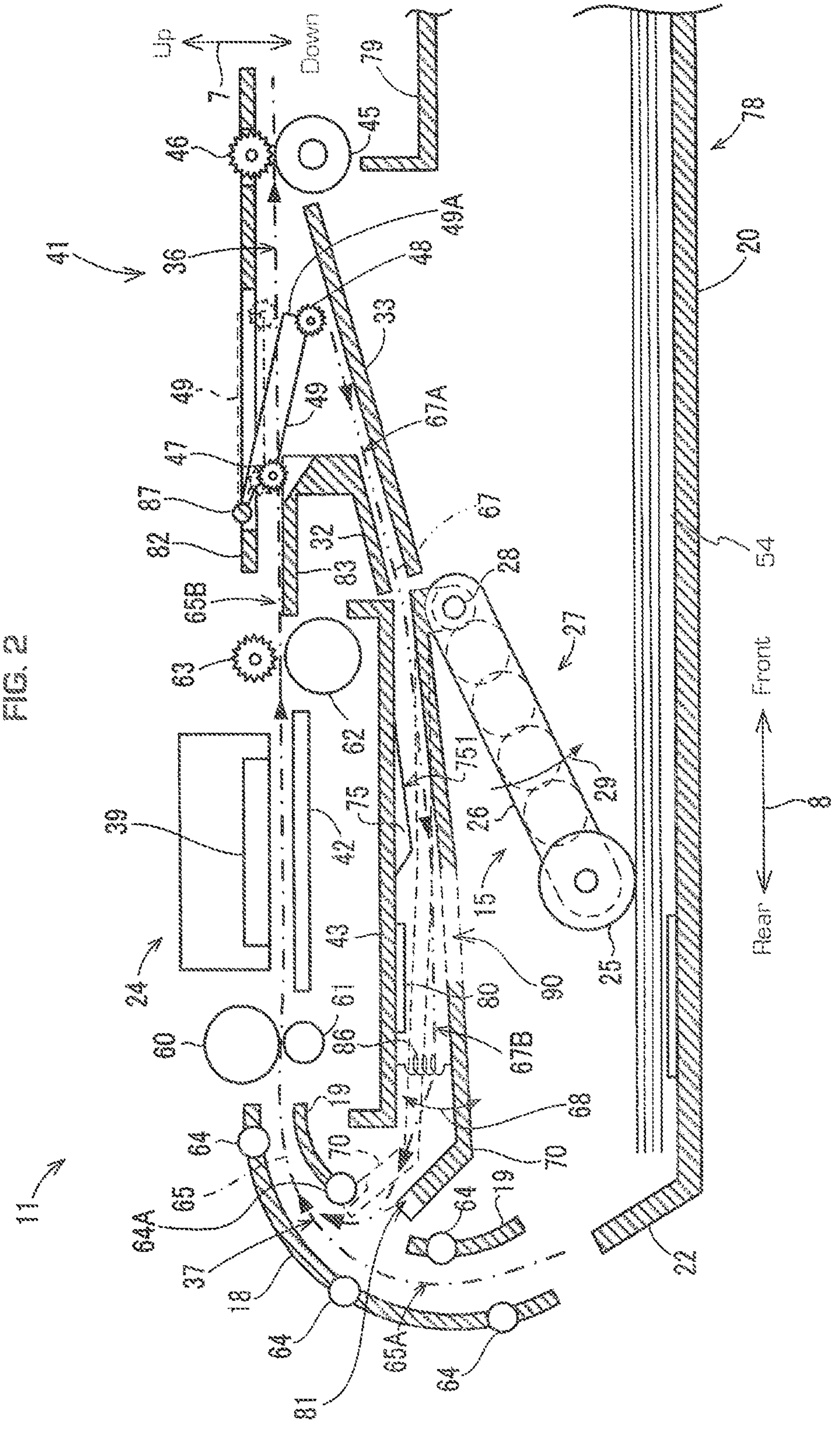
FIG. 2 is a vertical cross-sectional view schematically illustrating an internal structure of a printer.

Next, a configuration of the printer 11 will be described with reference to FIG. 2. In FIG. 2, illustration of a front side of the sheet tray unit 78 (right side in the figure) is omitted. The sheet tray unit 78 includes the tray 20 on which sheets of various sizes can be stacked, and a discharged sheet receiver 79 that holds sheets discharged from the printer 11 after image recording.

The printer 11 includes a sheet feeder 15 for picking up and feeding a sheet from the tray 20, a recording unit 24 of an inkjet recording type for recording an image on a sheet fed by the sheet feeder 15 by discharging ink droplets onto the sheet, and a path switching unit 41. The recording unit 24 is not limited to the inkjet recording type, various recording types such as an electrophotographic recording type may be used for the recording unit 24.

In the printer 11, a conveying path 65 extends from a rear end of the tray 20 to the discharged sheet receiver 79. The conveying path 65 includes a curved path 65A, which functions as a first conveying path, provided between the rear end of the tray 20 and the recording unit 24, and a discharge path 65B provided between the recording unit 24 and the discharged sheet receiver 79.

The curved path 65A extends from a portion near an upper end of an inclined separation plate 22 provided in the tray 20 to the recording unit 24, and is substantially shaped like an arc centered on an inner portion of the printer 11. A sheet fed from the tray 20 is guided to the recording unit 24 along the curved path 65A. The curved path 65A is defined by a feed guide including an outer guide 18 and an inner guide 19 that are opposed to each other with a predetermined gap therebetween. The outer guide 18 and the inner guide 19, as well as an upper guide 82, a lower guide 83, and a support member 43, which will be described below, extend in a direction perpendicular to a drawing sheet plane of FIG. 2 (in the right-left direction 9 in FIG. 1).

A plurality of guide rollers 64 are provided in the curved path 65A. Each guide roller 64 is rotatable on an axis extending in the width direction of the curved path 65A and a roller surface thereof is exposed from the outer guide 18 or the inner guide 19. In the outer guide 18 and the inner guide 19, a plurality of rows (not shown) of guide rollers 64 are arranged from the upstream side to the downstream side in the conveying direction of the sheet while each row of guide rollers 64 extends in the width direction of the curved path 65A. The guide rollers 64 allow smooth conveyance of the sheet that comes into contact with the guide surfaces at a curved portion of the curved path 65A. Instead of freely rotatable guide rollers 64, rollers to be rotated by driving force transmitted from a driving source, or ribs protruding from the outer guide 18 or the inner guide 19 into the curved path 65A may be used.

The discharge path 65B extends substantially horizontally from a downstream-side portion of the recording unit 24 in a first conveying direction to the discharged sheet receiver 79. Here, the first conveying direction refers to a direction in which the sheet is conveyed through the conveying path 65 (a direction shown by a one-dot-one-dash line with arrows in FIG. 2). An upstream side of the discharge path 65B is defined by the upper guide 82 and the lower guide 83 opposed to each other with a predetermined gap therebetween.

A branch port 36 is provided on the downstream side of the recording unit 24 in the first conveying direction. During duplex image recording, the sheet conveyed in the discharge path 65B is switched back on the downstream side of the branch port 36, and is then conveyed toward a return path 67 described below. The return path 67 functions as a second conveying path.

The recording unit 24 is provided above the tray 20, and reciprocates in a direction perpendicular to the drawing sheet plane of FIG. 2 (main scanning direction). Below the recording unit 24, a platen 42 for horizontally holding a sheet is provided. While reciprocating, the recording unit 24 discharges ink, which is supplied from an ink cartridge (not shown), from nozzles 39 onto the sheet conveyed on the platen 42, so that an image is recorded on the sheet.

A first conveying roller 60 and a pinch roller 61 are provided between the recording unit 24 and front ends of the outer guide 18 and the inner guide 19. The pinch roller 61 is provided under the first conveying roller 60, and is pressed against a roller surface of the first conveying roller 60 by an elastic member (not shown) such as a spring. The first conveying roller 60 and the pinch roller 61 nip the sheet that has been conveyed through the curved path 65A, and convey the sheet onto the platen 42.

A second conveying roller 62 and a spur roller 63 are provided as a pair between the recording unit 24 and rear ends of the upper guide 82 and the lower guide 83. Similarly to the pinch roller 61, the spur roller 63 is pressed against a roller surface of the second conveying roller 62. The second conveying roller 62 and the spur roller 63 nip a sheet on which an image has been recorded by the recording unit 24, and convey the sheet downstream in the first conveying direction (toward the discharged sheet receiver 79).

The first conveying roller 60 and the second conveying roller 62 are rotated by rotational driving force transmitted from a conveying motor (not shown) via a driving transmission mechanism (not shown). The driving transmission mechanism includes a planetary gear and so on, and rotates the first conveying roller 60 and the second conveying roller 62 in one direction so as to convey the sheet in the first conveying direction in whichever of the forward or reverse rotating directions the conveying motor is rotated. The first conveying roller 60 and the second conveying roller 62 are intermittently driven during image recording, so that an image is recorded on the sheet that is being fed by a predetermined line feed width.

The sheet feeder 15 is configured to convey sheets stored in the tray 20 toward the curved path 65A, and includes a plurality of feed rollers 25 (see FIG. 5A), an arm 26, and a driving transmission mechanism 27.

The feed rollers 25 pick up the uppermost one of the sheets stacked on the tray 20, and feed the sheet to the curved path 65A. The feed rollers 25 are rotatably supported at an end of the arm 26, and are rotated by an auto sheet feed (ASF) motor (not shown) via the driving transmission mechanism 27 that includes a plurality of gears arranged in a substantially straight line, represented in FIG. 2 by the dotted circles disposed within the arm 26. The ASF motor serves as a driving source different from the conveying motor. The driving transmission mechanism 27 is rotatably supported on the arm 26. The ASF motor is rotated in one of the forward and reverse rotating directions. By the rotation of the ASF motor, the feed rollers 25 are rotated in a direction to feed the sheet to the curved path 65A.

A base shaft 28 is provided above the tray 20 and below the recording unit 24. The arm 26 is supported at its base end by the base shaft 28, and can pivot about the base shaft 28. Hence, a free end of the arm 26, having feed rollers 25, can move in the up-down direction close to and away from the tray 20. A force in a direction of arrow 29 in FIG. 2 is applied onto the arm 26 by the weight of the arm 26 and/or by elastic force of an elastic member such as a spring. For this reason, the feed rollers 25 can be in pressing contact with an upper surface of a sheet stored in the tray 20. That is, in a state in which the feed rollers 25 are in pressing contact with the upper surface of the sheet, the arm 26 takes a first arm position, i.e., a close position to the tray such that the free end thereof (the end having the feed rollers 25) is in proximity to a bottom plate 54 of the tray 20. When the arm 26 is in the first arm position (close position), the feed rollers 25 feed an uppermost sheet in the tray 20.

Figure 4:
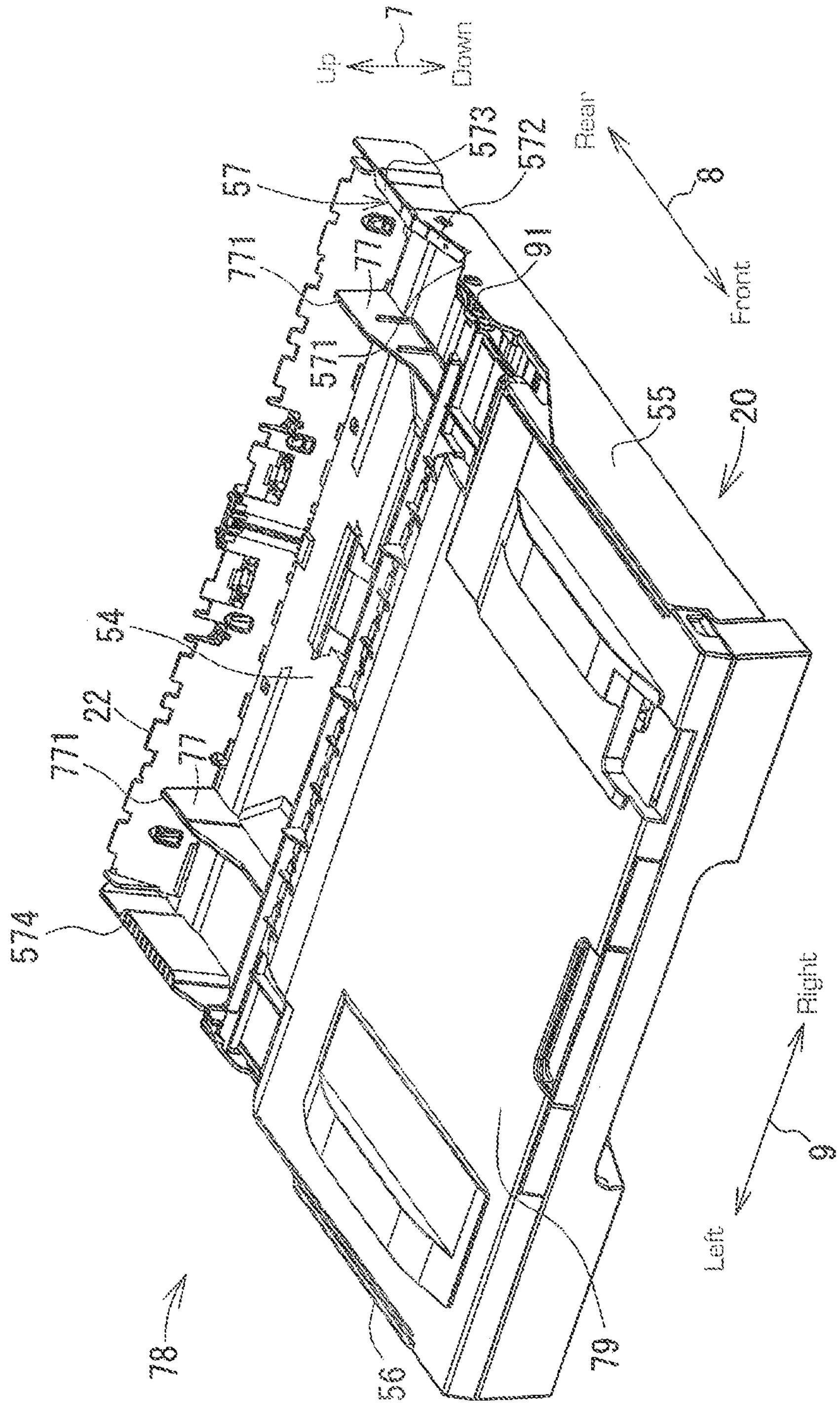
FIG. 4 is a perspective view of the sheet tray unit.
Figure 5A:
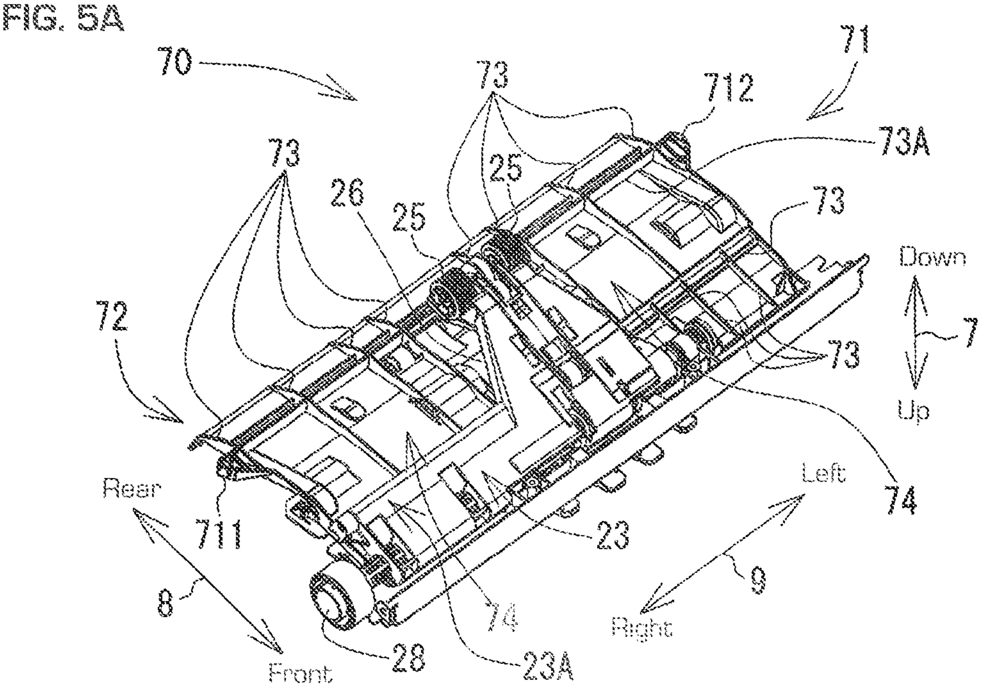
FIGS. 5A and 5B are a bottom perspective view and a top perspective view, respectively, of a return guide.

FIG. 5A shows the arm 26 and a return guide 70 upside down from that shown in FIG. 2. Therefore, the up-down direction 7 and the left-right direction 9 are shown in the opposite direction. The arm 26 is shaped like a casing covering the driving transmission mechanism 27 (see FIG. 2). A lower surface 23 of the arm 26 covers not only the driving transmission mechanism 27, but also a portion on one side of the center of the base shaft 28. As will be described below, an end portion 23A of the lower surface 23 of the arm 26 can come into contact with a cam portion 57 provided in a side plate 55 of the tray 20 (see FIG. 4).

Figure 6A:
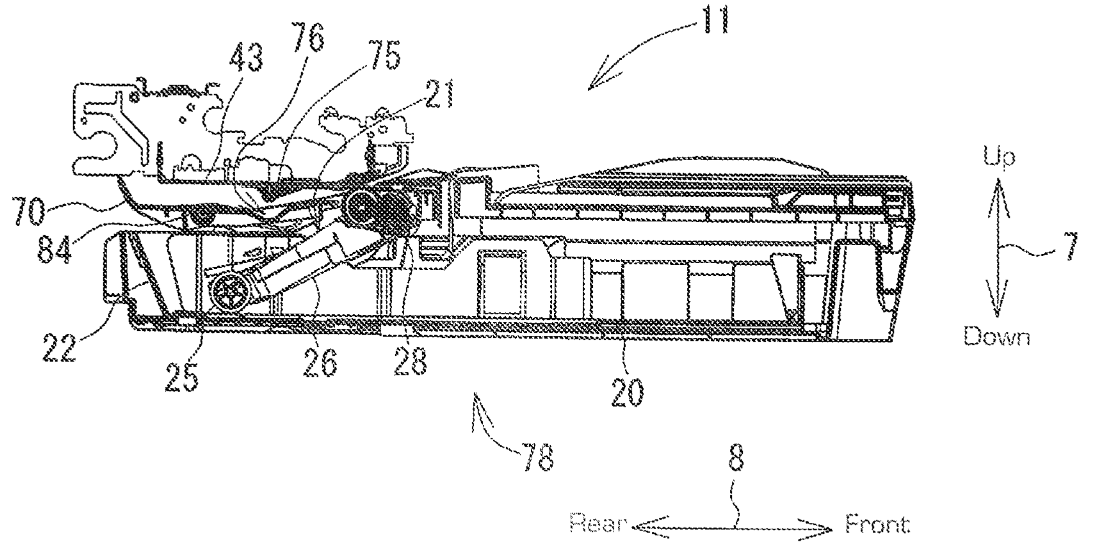
FIGS. 6A and 6B are vertical cross-sectional views illustrating respectively, a state in which the return guide is in a conveying position and a state in which the return guide is in a retracted position.
Figure 6B:
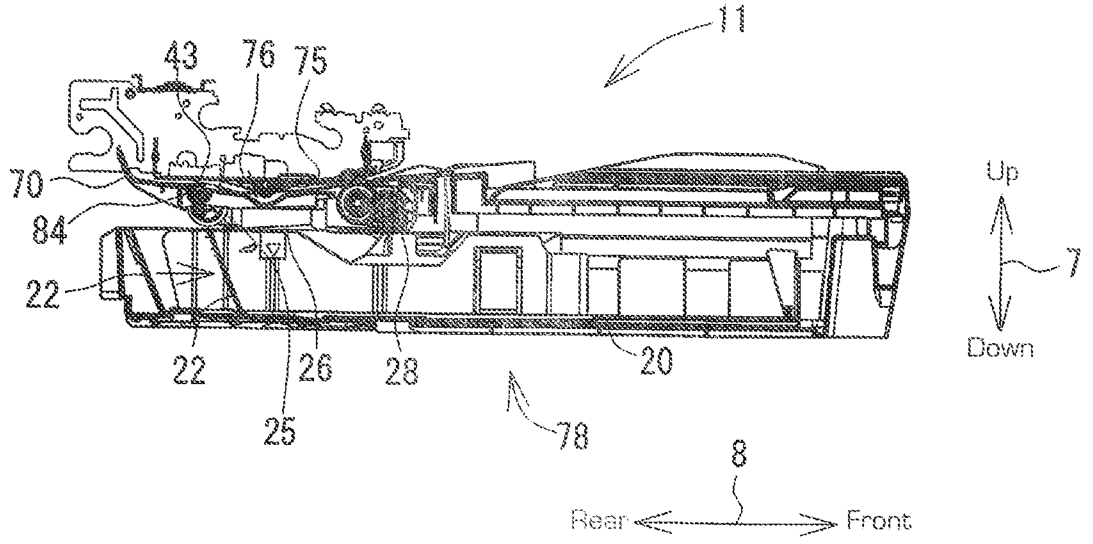

The end portion 23A of the lower surface 23 of the arm 26 is pushed by the cam portion 57 provided in the side plate 55 of the tray 20 when the tray 20 is drawn out of the printer 11, and the arm 26 thereby pivots upward. The arm 26 pushed up by the cam portion 57 takes a second arm position, as shown in FIG. 6B, i.e., a remote position from the tray 20 such that the free end (the end having the feed rollers 25) is farther from the bottom plate 54 of the tray 20 than in the first arm position (close position) and is retracted from an insertion space for the tray 20. From the above-described structures, the arm 26 pivots between the close position (first arm position shown in FIG. 6A) and the remote position (second arm position shown in FIG. 6B). A direction in which the end portion 23A of the lower surface 23 of the arm 26 is pushed by the cam portion 57 of the side plate 55 is the same as a direction in which the arm 26 pivots from the close position to the remote position.

On a side opposite of the lower surface 23, the arm 26 has an upper surface 21 (see FIG. 6A), which functions as a pushing portion. The upper surface 21 comes into contact with a return guide 70, which will be described below, when the arm 26 pivots from the close position to the remote position.

Figure 3:
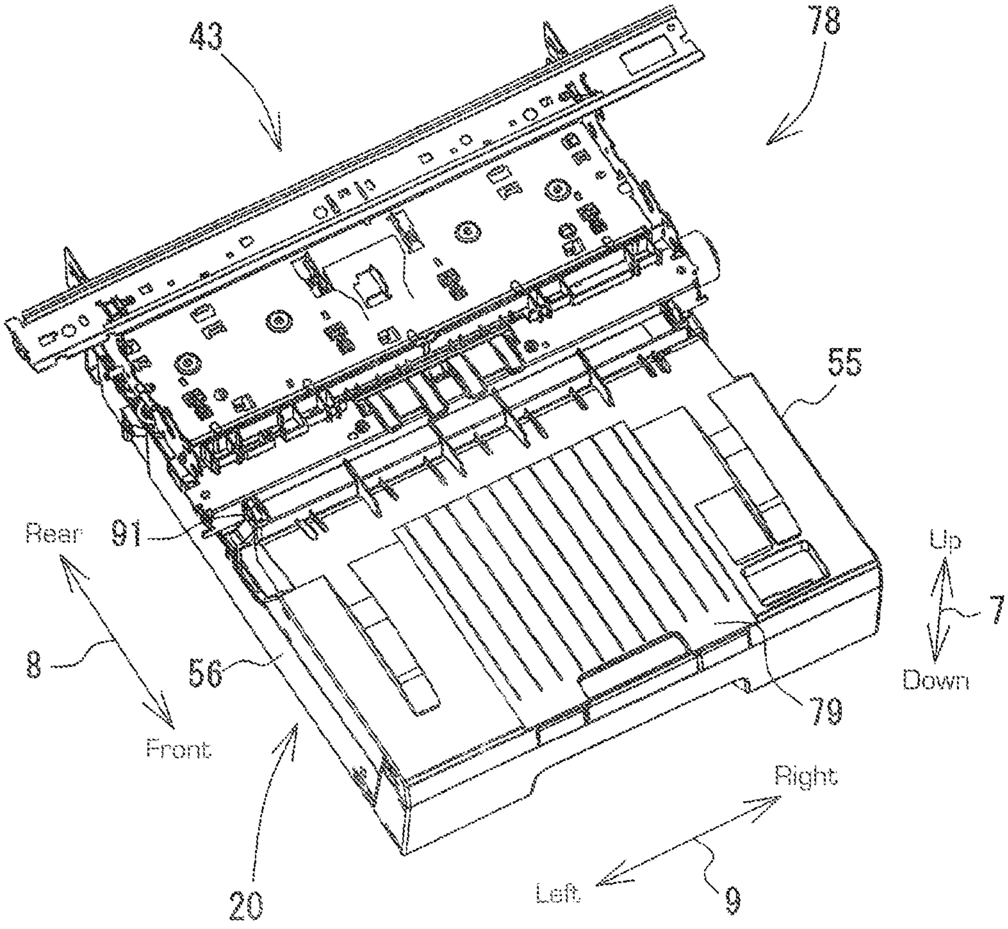
FIG. 3 is a perspective view of a sheet tray unit and a support member.

The sheet tray unit 78 is provided below the sheet feeder 15. As shown in FIGS. 3 and 4, the sheet tray unit 78 includes the tray 20 on which sheets of various sizes can be placed, and the discharged sheet receiver 79 that receives the sheets discharged from the recording unit 24 after image formation. The tray 20 and the discharged sheet receiver 79 are arranged in two tiers such that the discharged sheet receiver 79 is located above the tray 20. When the sheet tray unit 78 is inserted and removed through the opening 13, the discharged sheet receiver 79 is inserted and removed together with the tray 20. Alternatively, the discharged sheet receiver 79 may be provided separately from the sheet tray unit 78.

The tray 20 includes the bottom plate 54, which functions as a sheet holding surface, side plates 55 and 56 standing from both ends of the bottom plate 54 in the right-left direction 9 and extending in the front-rear direction 8 in which the sheet is fed, and an inclined separation plate 22 standing from a rear end of the bottom plate 54 and extending in the right-left direction 9. The tray 20 is shaped like a substantially rectangular box that is open on a top side.

The cam portion 57 is provided on an upper surface of the right side plate 55. The cam portion 57 includes a first inclined face 571 that is higher on the front side than on the rear side, a second inclined face 572 that is connected to the first inclined face 571 and is higher on the rear side than on the front side, and a horizontal face 573 connected to the rear side of the second inclined face 572. The horizontal face 573 substantially extends to the rear end of the side plate 55, and has a height substantially equal to the height of an upper end of the inclined separation plate 22. From the above-described structures, the height of the cam portion 57 changes with respect to the bottom plate 54 in the front-rear direction 8.

When the tray 20 is inserted into the printer 11 or drawn out of the printer 11, the cam portion 57 slides in the front-rear direction 8 and comes into contact with the lower surface 23 of the arm 26. In this case, the height of the arm 26 changes depending on which of the faces 571, 572, and 573 of the cam portion 57 is in contact with the arm 26.

The inclined separation plate 22 is inclined rearward so as to smoothly guide the sheet. The sheet is conveyed from the rear end of the tray 20 to the curved path 65A provided on the upper rear side of the rear end, as described above.

A pair of side guides 77 stands on the bottom plate 54 of the tray 20, and extends in the front-rear direction 8. Either one of the side guides 77 is operated to slide along the bottom plate 54 in one of the right and left directions. In synchronization with this, the other side guide 77 slides in the other of the right and left directions. For this reason, if the width of the sheet placed on the bottom plate 54 is smaller than the distance between the two side guides 77, one of the side guides 77 is operated to slide toward the sheet, so that the other side guide 77 moves simultaneously. As a result, the center of the sheet in the width direction (right-left direction 9) substantially coincides with the center of the tray 20 in the width direction. That is, these side guides 77 can contact the edges of the sheet placed on the bottom plate 54. Sliding the side guides 77 allows sheets of various sizes, up to the size corresponding to the distance between the side plates 55 and 56 in the right-left direction 9, to be placed on the bottom plate 54.

Only one side guide 77 may be provided on the bottom plate 54 of the tray 20. In this case, a distance between the side guide 77 and one of the side plates 55 and 56 is adjusted in correspondence with a sheet placed on the bottom plate 54.

The discharged sheet receiver 79 can pivot upward from the tray 20 about a shaft 91 that is rotatably supported by the side plates 55 and 56. That is, the discharged sheet receiver 79 serves as a movable cover for the tray 20. When the discharged sheet receiver 79 is opened upward by the user in a state in which the sheet tray unit 78 is outside the multi-function device 10, an upper front side of the tray 20 is opened so as to expose the bottom plate 54. This allows the sheet to be placed in the tray 20 from the front side.

As shown in FIG. 2, the path switching unit 41 is provided near the branch port 36 in the conveying path 65. The path switching unit 41 includes a third conveying roller 45, a spur roller 46, and a flap 49.

The third conveying roller 45 is provided on the downstream side of the lower guide 83, and is rotatably supported by a frame of the printer 11 as an example. The branch port 36 is provided between the third conveying roller 45 and the lower guide 83. The spur roller 46 is provided above the third conveying roller 45, and is urged, by the weight thereof and/or by biasing force of a spring or the like, in a direction to press a roller surface of the third conveying roller 45. Further, the spur roller 46 is rotatably supported at a downstream end of the upper guide 82. The third conveying roller 45 is driven by the conveying motor (not shown) to rotate in a forward or reverse direction. For example, for one-sided recording, the third conveying roller 45 is driven to rotate in the forward direction, so that the sheet is conveyed downstream while being nipped between the third conveying roller 45 and the spur roller 46 and is discharged to the discharged sheet receiver 79. In contrast, for duplex recording, the rotating direction of the third conveying roller 45 is switched from forward to reverse when the rear end of the sheet is being nipped between the third conveying roller 45 and the spur roller 46.

A support shaft 87 is provided, for example, on the frame of the printer 11, and extends in the direction perpendicular to the drawing sheet plane of FIG. 2 (right-left direction 9 in FIG. 1). The flap 49 extends substantially downstream from the support shaft 87, and is pivotably supported by the support shaft 87. The flap 49 rotatably supports an auxiliary roller 47 and an auxiliary roller 48 that are spaced from each other in the extending direction of the flap 49. Since roller surfaces of the auxiliary rollers 47 and 48 are to be in contact with the recording surface of the sheet, the auxiliary rollers 47 and 48 are shaped as spur rollers, similarly to the spur rollers 63 and 46.

The flap 49 can change its position, and pivots between a discharging position higher than the lower guide 83 (position shown by a broken line in FIG. 2) and a reversing position where an extending end portion 49A thereof is placed below the branch port 36 (position shown by a solid line in FIG. 2). After passing through the recording unit 24, the sheet is conveyed downstream in the first conveying direction when the flap 49 is in the discharging position, and is switched back into the return path 67 when the flap 49 in the reversing position.

The return path 67 guides the sheet from the downstream side of the recording unit 24 in the first conveying direction to the upstream side of the first conveying roller 60 in the first conveying direction. The return path 67 branches from the discharge path 65B at the branch port 36, extends below the recording unit 24 and above the driving transmission mechanism 27, and joins the curved path 65A at a joint portion 37 on the upstream side of the recording unit 24 in the first conveying direction. The sheet is conveyed through the return path 67 in a second conveying direction. Here, the second conveying direction refers to a direction shown by a two-dot-one-dash line with arrows in FIG. 2. As described above, the return path 67 guides, to the curved path 65A, a sheet having an image recorded on one side thereof by the recording unit 24.

The return path 67 includes a first path 67A and a second path 67B. The first path 67A is defined by an upper inclined guide 32 and a lower inclined guide 33 that have inclined surfaces inclined from the branch port 36 to the lower rear side. The upper inclined guide 32 is provided integrally with the lower guide 83. The upper inclined guide 32 and the lower inclined guide 33 are opposed to each other with a predetermined gap therebetween such that the sheet can pass therebetween. The upper inclined guide 32 is provided above the lower inclined guide 33.

The second path 67B extends rearward in a substantially downward curve from a portion near a terminal end of the first path 67A, and is curved upward to a portion immediately before the joint portion 37. The second path 67B is defined by the return guide 70 supported to pivot in a direction of arrow 68 in FIG. 2, and a support member 43 attached to the frame of the printer 11 and provided above the return guide 70 so as to support the recording unit 24. As will be described below, the return guide 70 can take a first return guide position, as shown in FIG. 6A (and FIG. 2 in solid line), i.e., a conveying position that forms a part of the return path 67. The return guide 70 in the conveying position and the support member 43 are opposed to each other with a predetermined gap therebetween such that the sheet can pass therebetween.

The return guide 70 is provided between the recording unit 24 and the arm 26 of the sheet feeder 15, that is, below the recording unit 24 and above the arm 26 of the sheet feeder 15.

Figure 5B:
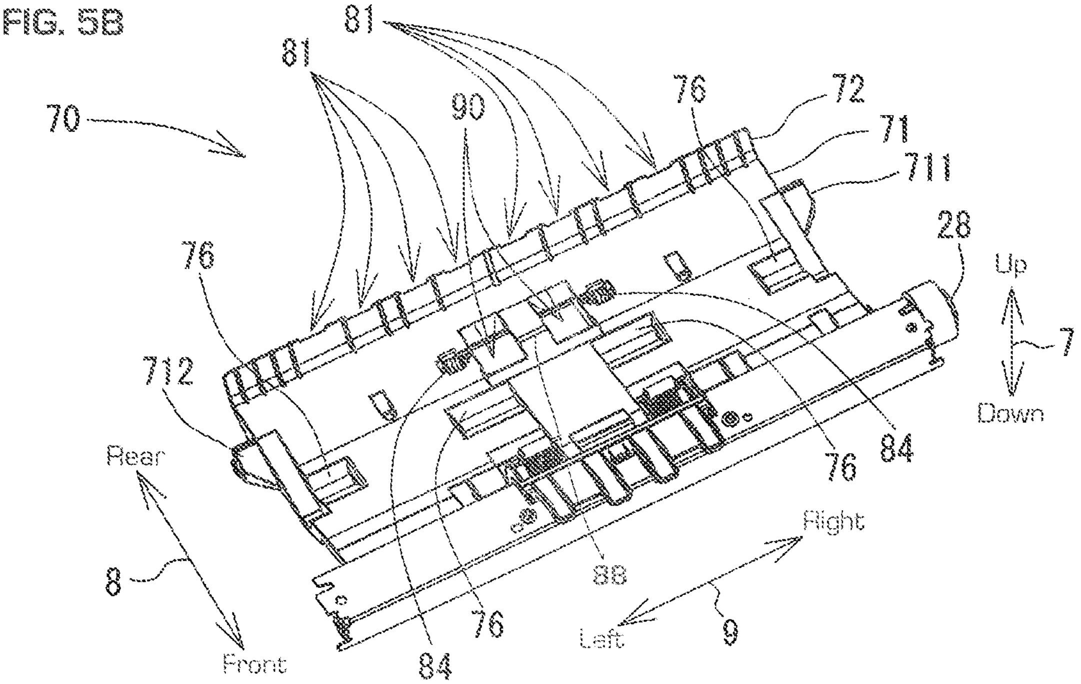

As illustrated in FIGS. 5A and 5B, the return guide 70 is shaped like a substantially thin, flat, rectangular plate whose dimension in the up-down direction 7 is smaller than dimensions in the front-rear direction 8 and the right-left direction 9. The return guide 70 includes a first plate member 71, and a second plate member 72 provided integrally with a rear end of the first plate member 71. In this embodiment, the first plate member 71 and the second plate member 72 are provided with ribs 73 extending in the front-rear direction 8 and the right-left direction 9 in order to complement the insufficient rigidity due to the small thickness. Alternatively, the return guide 70 may have no rib 73.

The first plate member 71 and the second plate member 72 are attached to each other to form a predetermined angle therebetween such that the second plate member 72 points more upward than the first plate member 71. Thus, the first plate member 71, the second plate member 72, and the curved path 65A form a substantially arc-shaped path, as shown in FIGS. 2 and 6A, and the sheet conveyed through the return path 67 is smoothly guided to the curved path 65A.

The first plate member 71 is supported at its base end (front end) by the base shaft 28 of the sheet feeder 15, and can pivot about the base shaft 28. In other words, the pivot shaft of the return guide 70 is the same as the pivot shaft of the arm 26 of the sheet feeder 15. By being supported on the base shaft 28, a free end of the return guide 70 can move up and down closer to and away from the recording unit 24. Thus, the return guide 70 can pivot to take the first return guide position, as shown in FIG. 6A (and FIG. 2 in solid line), for forming at least a part of the return path 67 and a second return guide position, as shown in FIG. 6B (and FIG. 2 in broken line), i.e., a retracted position where the free end of the return guide 70 is closer to the recording unit 24 than in the conveying position. When the return guide 70 is in the conveying position, a predetermined gap through which the sheet can pass is maintained between an upper surface of the return guide 70 and the support member 43, as shown by a solid line in FIG. 2 and in FIG. 6A. Further, in this embodiment, the first plate member 71 is slightly inclined downward from the front end toward the rear end in order to minimize the curvature of the curved path 65A. When the return guide is in the retracted position, the upper surface of the return guide 70 is located in proximity to the support member 43, as shown by a broken line in FIG. 2 and in FIG. 6B. Alternatively, the pivot shafts of the return guide 70 and the arm 26 may be provided separately.

The return guide 70 has openings 90 formed at positions opposed to the feed rollers 25. The openings 90 are formed though a surface of the return guide 70 on which the sheet is conveyed. More specifically, as shown in FIGS. 2 and 5B, the openings 90 are provided in the return guide 70 at such positions to accommodate at least parts of the feed rollers 25 (e.g., surfaces of the feed rollers 25 above the arm 26) when the arm 26 is in the remote position. The return guide 70 includes a raised portion 88 between the openings 90. The raised portion 88 guides the sheet conveyed on the surface of the return guide and prevents the sheet from being caught in the openings 90.

The return guide 70 is configured to pivot to the retracted position in association with the pivoting of the arm 26 to the remote position. The return guide 70 is pushed upward by the upper surface 21 of the arm 26 (see FIG. 6A) pivoting to the remote position, and thereby pivots to the retracted position. The upper surface 21 of the arm 26 can come into contact with a lower surface 74 of the first plate member 71 opposite a surface on which the sheet is conveyed (see FIG. 5A). The lower surface 74 functions as a first contact portion. When the arm 26 pivots from the close position to the remote position, the upper surface 21 of the arm 26 comes into contact with the lower surface 74 of the first plate member 71. The lower surface 74 is pushed by the upper surface 21 in a direction in which the return guide 70 pivots from the conveying position to the retracted position. As a result, the return guide 70 takes the retracted position when the arm 26 takes the remote position. Further, when the tray 20 has been removed from the multi-function device 10, the return guide 70 pivots to a third return guide position, shown in FIG. 7, where the free end (rear end) thereof is farther from the recording unit 24 than in the conveying position (first return guide position).

With reference to FIG. 2 through FIG. 7, the operation of the structures described above in relation to removal of the tray 20 will be described in detail below. As shown in FIG. 5A, the sheet feeder 15, including the feed arm 26 and the feed rollers 25, is provided below the return guide 70. In FIG. 6A, the sheet feeder 15 is in the close position, and the return guide 70 is in the conveying position.

When the sheet feeder 15 is in the close position, the feed rollers 25 are in contact with the upper surface of the sheet or the bottom plate 54. The feed rollers 25 contact the bottom plate 54 if there are no sheets in the tray 20. The end portion 23A of the lower surface 23 of the arm 26 is located above the first inclined face 571 and the second inclined face 572 and below the horizontal face 573. In addition, the end portion 23A of the lower surface 23 is spaced from the cam portion 57.

When the tray 20 is drawn forward, i.e. removed, from the fully inserted state described above, the lower surface 23 comes into contact with the second inclined face 572, and moves upward along the second inclined face 572. As a result, the arm 26 pivots upward, and the feed rollers 25 are lifted up. That is, the arm 26 starts to change its position from the close position to the remote position while the end portion 23A contacts the second inclined face 572. The arm 26 pivots to the remote position when the end portion 23A reaches the horizontal face 573.

When the sheet feeder 15 pivots upward by a predetermined amount, the upper surface 21 of the arm 26 comes into contact with the lower surface 74 of the first plate member 71. In this case, at least parts of the feed rollers 25 enter the openings 90 of the return guide 70, and therefore, the feed rollers 25 do not come into contact with the return guide 70.

When the tray 20 is further drawn forward in this state, the sheet feeder 15 pivots by movement of the lower surface 23, and the sheet feeder 15 and the return guide 70 pivot upward together. That is, the return guide 70 starts to change its position from the conveying position to the retracted position. This pivoting continues until the end portion 23A of the lower surface 23 comes into contact with the horizontal face 573 (see FIG. 6B) after climbing to the top of the second inclined face 572. In the state in which the lower surface 23 is in contact with the horizontal face 573, the sheet feeder 15 is in the remote position, and the return guide 70 is in the retracted position.

In other words, the arm 26 pushes the return guide 70 upward, and thereby takes the remote position in a space where the return guide 70 has been in the conveying position. That is, the space occupied by the arm 26 in the remote position overlaps the space the return guide 70 occupies in the conveying position.

Even if the tray 20 is further drawn forward in this state, the sheet feeder 15 maintains the remote position while the end portion 23A is in contact with the horizontal face 573.

When the tray 20 is further drawn forward in this state and the horizontal face 573 comes out from the front side of the end portion 23A, the feed rollers 25 move down. This is because the arm 26 is biased in the direction of arrow 29 in FIG. 2. Hence, the sheet feeder 15 pivots downward and changes its position from the remote position to a position lower than the close position, as shown in FIG. 7.

Figure 7:
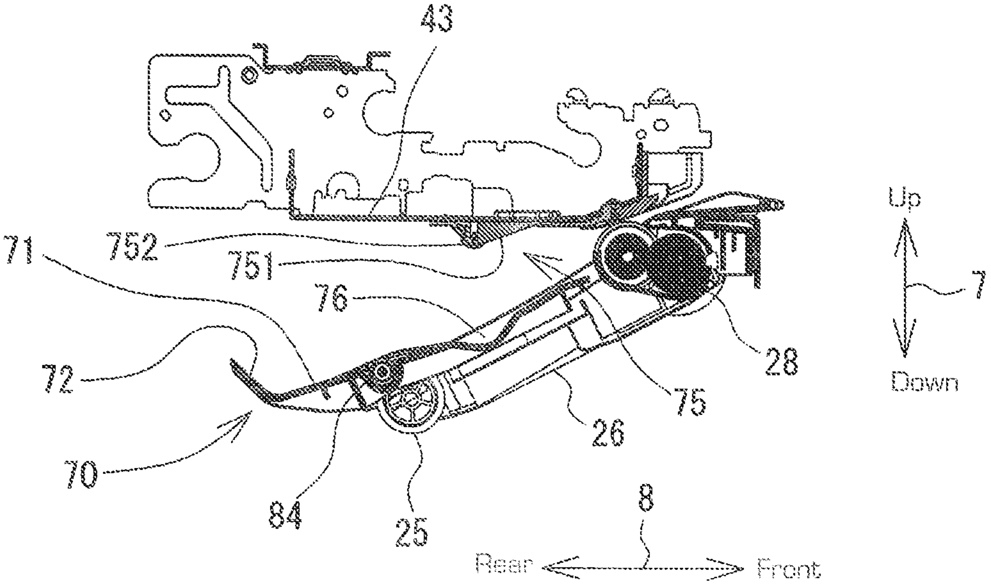
FIG. 7 is a vertical cross-sectional view of the return guide in a position more retracted from a recording unit than in the conveying position.

When the sheet feeder 15 changes its position from the remote position to the position lower than the close position, the return guide 70 correspondingly pivots to a third return guide position (see FIG. 7). While the return guide 70 is supported by the tray 20, as will be described below, it loses the support when the tray 20 is drawn out of the multi-function device 10.

In the above description, the return guide 70 pivots to the retracted position by being pushed up by the upper surface of the arm 26 pivoting to the remote position. However, other structures may be adopted as long as the return guide 70 can pivot in association with insertion and removal of the tray 20.

For example, in another embodiment, the arm 26 and the return guide 70 may pivot by driving force transmitted from a driving source (the above-described conveying motor, an ASF motor, or other motors). The arm 26 and the return guide 70 may be driven by the same driving source or different driving sources.

In the another embodiment, the driving force is transmitted to the arm 26 and the return guide 70 in association with insertion and removal of the tray 20. When the tray 20 loaded in the multi-function device 10 starts to move forward out of the multi-function device 10, the arm 26 and the return guide 70 start to pivot by the driving force transmitted from the driving source. Then, the arm 26 pivots from the close position to the remote position, and the return guide 70 pivots from the conveying position to the retracted position. When the pivoting is completed, the transmission of driving force from the driving source is stopped. In this embodiment, even when the tray 20 is removed from the multi-function device 10, the arm 26 remains in the remote position, and the return guide 70 remains in the retracted position. When the tray 20 is inserted in the multi-function device 10 in this state and the inserting operation is completed, the arm 26 and the return guide 70 start to pivot by the driving force transmitted from the driving source. Then, the arm 26 pivots from the remote position to the close position, and the return guide 70 pivots from the retracted position to the conveying position.

Returning to the embodiment shown in the figures, the return guide 70 in the conveying position is supported by the tray 20. As shown in FIGS. 5A and 5B, the first plate member 71 of the return guide 70 has second contact portions, i.e., projections 711 and 712 at both ends in the right-left direction 9. Further, the horizontal face 573 is provided at the upper end of the right side plate 55 of the tray 20 in the sheet tray unit 78, as described above. A horizontal face 574 is also provided at an upper end of the left side plate 56 of the tray 20 (see FIG. 4). While the return guide 70 in the conveying position, a lower face of the projection 711 is in contact with an upper surface of the horizontal face 573, and a lower surface of the projection 712 is in contact with an upper surface of the horizontal face 574, so that the return guide 70 is supported by the tray 20, as shown in FIG. 6A.

When the return guide 70 warps by a predetermined amount in the conveying position, the return guide 70 is supported by the side guides 77. The return guide 70 in the conveying position is normally located above the side guides 77. In this case, if the center of the return guide 70 in the right-left direction 9 moves by a predetermined amount to a position lower than both ends, that is, the return guide 70 warps by the predetermined amount, upper ends 771 (see FIG. 4) of the side guides 77 come into contact with a third contact portion, i.e., a rib 73A extending in the right-left direction 9. This prevents the return guide 70 from warping by an amount more than the predetermined amount.

As shown in FIGS. 2, 6A and 6B, projected guide members 75 are provided on a lower surface of the support member 43 and are projected toward the return guide 70. The projected guide members 75 face a portion near the center of an upper surface of the first plate member 71 of the return guide 70 in the front-rear direction 8. The projected guide members 75 have parallel faces 751 (see FIGS. 2 and 7) substantially parallel to the upper surface of the return guide 70 located in the conveying position. Thus, the sheet conveyed to the return path 67 by the path switching unit 41 is conveyed near the upper surface of the return guide 70. Further, the projected guide members 75 are arranged at four positions in the right-left direction 9, that is, provided at two positions near both ends of the return path 67 and two positions near the center.

While the projected guide members 75 are preferably provided at positions facing the center of the return guide 70 in the conveying direction of the sheet, i.e., in the front-rear direction 8, they may be provided at positions different from the center. Further, while a plurality of projected guide members 75 are preferably arranged in the direction perpendicular to the conveying direction of the sheet, as in the embodiment in which four projected guide members 75 are arranged in the right-left direction 9, only one projected guide member 75 or a plurality of projected guide members other than four may be provided.

Rollers 752 (see FIG. 7) may be provided near lower ends of the projected guide members 75. The rollers 752 are rotatable on the axis extending in the right-left direction 9 in a manner such that roller surfaces thereof are exposed from lower sides of the projected guide members 75. The rollers 752 may be set at any positions in the right-left direction 9 so long as the rollers 752 do not interfere with the feed roller 25 and the driving transmission mechanism 27. Only one roller 752 may be provided, or a plurality of rollers 752 may be arranged in the right-left direction 9. Further, each roller 752 may be shaped as a spur roller, because a roller surface of the roller 752 is to be in contact with the recording surface of the sheet. The roller 752 allows the sheet to be smoothly conveyed in contact therewith.

As shown in FIG. 5B, the return guide 70 has first accommodating portions, i.e., first recesses 76 arranged in a direction perpendicular to a sheet conveying direction. The first recesses 76 are shaped to conform to the projected guide members 75 and are slightly larger than the projected guide members 75 so as to accommodate the projected guide members 75. In this embodiment, the first recesses 76 are provided at positions opposed to the projected guide members 75 in the right-left direction 9, that is, at two positions near both ends of the return guide 70 and two positions near the center. The first recesses 76 may be replaced with through holes.

Since the projected guide members 75 and the first recesses 76 have the above-described structures, the projected guide members 75 are accommodated in the first recesses 76 when the return guide 70 pivots to the retracted position, as shown in FIG. 6B.

As shown in FIG. 2, a buffer member 80 is provided on the support member 43 at a position opposed to the upper surface of the return guide 70. The buffer member 80 is formed by an absorber of sponge or the like, a damper, or a spring such as a leaf spring or a resin spring member. The buffer member 80 is attached to the lower surface of the support member 43 at a position opposed to the upper surface of a rear end side of the first plate member 71 of the return guide 70. The buffer member 80 may be provided on an outer side of the sheet conveying path in the direction perpendicular to the sheet conveying direction.

As shown in FIG. 2, second accommodating portions, i.e., second recesses 81 shaped to conform to guide rollers 64A are provided on a surface of the second plate member 72 of the return guide 70 on which the sheet is conveyed, that is, at a downstream end of the return guide 70 in the return path 67. The second recesses 81 are arranged in the right-left direction 9 so as to oppose the guide rollers 64A provided in the inner guide 19. The guide rollers 64A are accommodated in the second recesses 81 when the return guide 70 pivots to the retracted position. Alternatively, the second recesses may be provided on a surface of the first plate member 71 when the guide rollers 64A are provided so as to oppose the first plate member 71.

As shown in FIG. 5B, auxiliary rollers 84 are provided at positions on the downstream side of the return guide 70 in the conveying direction of the sheet. The auxiliary rollers 84 are provided rotatably on the axis extending in the right-left direction 9 such that roller surfaces thereof are exposed from the conveying surface. The auxiliary rollers 84 may be rotated by driving force transmitted from a driving source (not shown) or may be rotatable freely without the driving force.

As shown in FIG. 2, an elastic member, e.g., two coil springs 86 for biasing the return guide 70 downward may also be provided. The coil springs 86 are attached at one end to the projections 711 and 712 of the return guide 70, and at the other end to the lower surface of the support member 43. The coil springs 86 are provided in the up-down direction 7. The coil springs 86 are compression springs whose total length is larger than the length between the projections 711 or 712 of the return guide 70 in the conveying position and the support member 43. Hence, the coil springs 86 bias the return guide 70 downward, regardless of the insertion or removal state of the sheet tray unit 78. Only one coil spring 86 may be provided. Alternatively, the coil springs 86 may be attached at the other end to a bottom frame of the multi-function device 10. In this case, the coil springs 86 are formed by tensile springs whose total length is shorter than the length between the projections 711 or 712 of the return guide 70 in the conveying position and the bottom frame of the multi-function device 10. Hence, the coil springs 86 bias the return guide 70 downward, regardless of whether the sheet tray unit 70 is in an inserted or removed state. When the sheet tray unit 70 is in an inserted state, the return guide 70 is supported by the tray 20 while being biased by the coil springs. Therefore, the position of the return guide 70 is stabilized further.

In the above-described embodiment, when a sheet is conveyed in the multi-function device 10, the arm 26 takes the close position so as to supply the sheet from the tray 20 to the curved path 65A. In this case, the return guide 70 takes the conveying position so as to form a part of the return path 67. When the tray 20 is inserted into and removed from the multi-function device 10, the arm 26 pivots to the remote position and is retracted from the insertion space for the tray 20. The space where the return guide 70 takes the conveying position overlaps the space where the arm 26 takes the remote position, so that the return guide 70 takes the retracted position when the arm 26 takes the remote position. Thus, the conveying position of the return guide 70 is located within the pivoting area of the arm 26.

Further, in the above-described embodiment, the arm 26 and the return guide 70 pivot about the same base shaft 28. Therefore, an extra space for a separate pivot shaft is not required. Moreover, the pivoting area of the arm 26 and the pivoting area of the return guide 70 overlap with each other. This prevents an increase in size of the multi-function device 10.

In the above-described embodiment, the return guide 70 forms a part of the return path 67 when being in the conveying position lower than the retracted position.

The projected guide members 75 provided on the lower surface of the support member 43 reduces a dimension in the up-down direction 7 of the return path 67. Therefore, the sheet is prevented from vertically swinging in the return path 67 and from jamming in the return path 67.

In the above-described embodiment, since the projected guide members 75 are provided at positions corresponding to the center of the return guide 70 in the conveying direction of the sheet, the projected guide members 75 guide both a relatively small sheet and a relatively large sheet reliably along the upper surface of the return guide 70.

In the above-described embodiment, the arm 26 pivots to the remote position when the lower surface 23 of the arm 26 is pushed by the side plate 55 of the tray 20. Therefore, no extra member other than the side plate 55 is required for pivoting the arm 26.

In the above-described embodiment, the return guide 70 pivots to the retracted position when the lower surface 74 of the return guide 70 is pushed by the upper surface 21 of the arm 26. Therefore, no extra member other than the arm 26 is required for pivoting the return guide 70.

In the above-described embodiment, the return guide 70 is shaped like a thin plate. In this case, the center portion of the return guide 70 in the right-left direction 9 may warp downward by the weight of the return guide 70 and conveyance resistance of the sheet. However, downward warp of the return guide 70 is restricted by the side guides 77, and therefore, the sheet is conveyed stably.

In the above-described embodiment, the return guide 70 is supported by the tray 20. This stably positions the return guide 70, and also stabilizes conveyance of the sheet in the return path 67. Moreover, since no load is applied from the return guide 70 to the arm 26, the return guide 70 has no influence on the supply of the sheet by the feed rollers 25.

In the above-described embodiment, the buffer member 80 is provided on the support member 43. The return guide 70 may pivot into collision with the upper support member 43 when the tray 20 is inserted into and removed from the multi-function device or when the multi-function device 10 is transported. Even if such collision occurs, the buffer member 80 prevents damage to the return guide 70.

In the above-described embodiment, when the tray 20 has been removed from the multi-function device 10, the return guide 70 takes the position father from the recording unit 24 than in the conveying position, and an extra space is provided above the return path 67. Therefore, even when the sheet jams in the return path 67, it can be readily removed by removing the tray 20 and opening the outer guide 18.

In the above-described embodiment, the arm 26 pivots upward and takes the remote position while the return guide 70 pivots upward. This prevents an increase in size of the multi-function device 10.

In the above-described embodiment, when the return guide 70 is in the retracted position, the rollers 64A provided in the curved path 65A are accommodated in the second recesses 81 provided in the return guide 70. Since this allows the rear end of the return guide 70 to extend more toward the curved path 65A, the sheet can be stably conveyed from the return path 67 to the curved path 65A. Further, when the return guide 70 is in the retracted position, the projected guide members 75 are accommodated in the first recesses 76 provided in the return guide 70. This increases the moving range of the return guide 70, and reduces the thickness of the multi-function device 10.

In the above-described embodiment, when the sheet conveyed on the return guide 70 enters the curved path 65A, a great resistance is produced particularly on the sheet. For this reason, the sheet comes into contact with portions of the upper surface of the return guide 70 on the downstream side in the conveying direction of the sheet. By placing the auxiliary rollers 84 at portions to be contacted by the sheet, the conveyance resistance is reduced and the sheet is conveyed smoothly.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. An image recording device comprising:

a recording unit configured to record an image on a sheet;

a guide including:

a guide surface defining a part of a path back toward the recording unit, the guide surface being configured to guide the sheet from below the sheet, the sheet being a sheet on which the recording unit has recorded the image, whereby the sheet is guided along the path back toward the recording unit;

a surface opposite to the guide surface;

an opening formed from the surface opposite to the guide surface to the guide surface;

a first roller; and a second roller, wherein the opening is positioned between the first roller and the second roller in a direction perpendicular to a direction of conveyance of the sheet; and a sheet feeder including:

a feed arm pivotable between a first arm position and a second arm position about a pivot axis located at one end portion of the feed arm; and a feed roller supported by the other end portion of the feed arm and configured to feed the sheet toward the recording unit, wherein a portion of the sheet feeder is positioned in the opening of the guide when the feed arm is in the second arm position, and wherein the pivot axis is located below the guide surface.

2. The image recording device according to claim 1, wherein the one end portion of the feed arm is configured to be supported by a shaft below the guide surface.

3. The image recording device according to claim 2, wherein the guide includes a protrusion holding the shaft.

4. The image recording device according to claim 1, wherein the direction is parallel to the pivot axis of the feed arm.

5. The image recording device according to claim 1, wherein the first roller, the opening and the second roller are aligned in the direction.

6. The image recording device according to claim 1, wherein the guide further includes another opening positioned between the opening and the second roller.

7. The image recording device according to claim 1, wherein at least a portion of a surface of the first roller is exposed from the guide surface.

8. The image recording device according to claim 7, wherein at least a portion of a surface of the second roller is exposed from the guide surface.

9. The image recording device according to claim 1, further comprising a tray including a sheet holding surface configured to hold the sheet thereon.

10. The image recording device according to claim 9, wherein the tray is movable to and from a feed position, and the feed roller is configured to feed the sheet from the tray in the feed position, and the feed arm is configured to pivot toward the second arm position in response to the tray moving toward the feed position.

11. The image recording device according to claim 9, wherein the tray is movable to and from a feed position, and the feed roller is configured to feed the sheet from the tray in the feed position, and the feed arm is configured to pivot toward the second arm position in response to the tray moving away from the feed position.

12. The image recording device according to claim 1, wherein the sheet feeder is entirely outside the opening of the guide when the feed arm is in the first arm position.

13. The image recording device according to claim 1, wherein the guide further includes a downstream guide surface angled to the guide surface and downstream of the guide surface in a direction in which the sheet is guided, the downstream guide surface defining a part of the path.

* * * * *